UNITED STATES PATENT OFFICE 2,616,902

SULFUR HALIDE DERIVATIVES OF DIHYDROANTHRAQUINONE

Hans Z. Lecher, Plainfield, and Karl C. Whitehouse, Somerville, N. J., assignors to American Cyanamid Company, New York, N. Y., a corporation of Maine No Drawing. Application June 7, 1951, Serial No. 230,427

8 Claims. (Cl. 260—384)

This invention relates to sulfur halide addition products of 1,4-dihydroanthraquinone which may be represented by the formula:

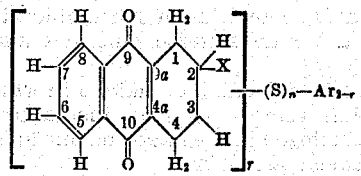

in which $r$ and $n$ are positive integers not greater than 2, Ar is an aromatic radical, and X is a halogen of atomic weight between 34 and 82.

1,4-dihydroanthraquinone possesses two double bonds of non-aromatic character, one between carbons 2 and 3, and the other between carbons 4a and 9a. Ordinarily, in such a compound, addition of sulfur halides would be expected to take place at both double bonds to form either a tetra-substituted compound or mixtures of isomeric di-substituted compounds. For some reason not as yet known, this does not occur and sulfur halide compounds react only with the double bond between the 2 and 3 carbon atoms, producing the compounds of the present invention which are chemically well defined and stable, and are useful as intermediates in the preparation of dyestuffs and other products. It is not known why the sulfur halides behave in this anomalous manner, and it is not intended to limit the invention to any theory of why the reaction takes place in this particular manner, making it possible for the first time to produce pure sulfur halide addition products of 1,4-dihydroanthraquinone.

The sulfur halide compounds which may be used in the present invention include inorganic compounds such as sulfur monochloride, sulfur dichloride, sulfur monobromide, or they may be organic compounds such as aromatic sulfenyl halides of the general formula Ar—S—X or compounds of the type Ar—S₂—X. Examples of the first type of compound are benzenesulfenyl chloride, p-chlorobenzenesulfenyl chloride, 2,4-dinitrobenzenesulfenyl chloride, 4-chloro-2-nitrobenzenesulfenyl bromide, 2-naphthalenesulfenyl chloride, 2-benzothiazolesulfenyl bromide and the like. A typical compound of the type Ar—S₂—X is

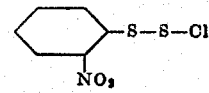

The preparation of the new compounds of the present invention proceeds smoothly by ordinary means, which is an advantage as no new technique has to be learned in order to produce the unusual reaction. It is, however, desirable to disperse the 1,4-dihydroanthraquinone in an inert organic liquid which may be a solvent and this constitutes a preferred embodiment of the process feature of the present invention. Typical inert organic liquids are carbon tetrachloride, tetrachloroethane, ethylene dichloride, chlorobenzene, chloroform, nitrobenzene, or acetic acid.

The reaction proceeds smoothly and the product may be recovered by conventional means.

The present invention will be described in greater detail in conjunction with the following specific examples, the parts being by weight.

Example 1

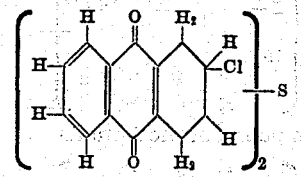

A solution of 3.1 parts of sulfur dichloride in 40 parts of sym. tetrachloroethane is slowly added to an agitated slurry of 10.5 parts of 1,4-dihydroanthraquinone in 120 parts of tetrachloroethane at a temperature of 20–25° C. Over a period of several hours, the mixture is gradually warmed to 45° C., and then poured into 320 parts of hexane. The yellow product is filtered and dried. It is obtained in substantially quantitative yield. It may be recrystallized from chlorobenzene. The yellow crystals melt at approximately 206° C. with decomposition.

Example 2

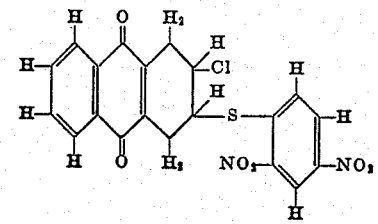

A slurry of 10.5 parts of 1,4-dihydroanthraquinone and 11.7 parts of 2.4-dinitrobenzenesulfenyl chloride in 160 parts of glacial acetic acid is gradually heated to 90–95° C., and held at this temperature for several hours until the reaction is complete. The yellow product is obtained in excellent yield by cooling and filtration. It may be recrystallized from glacial acetic acid. The yellow crystals melt at approximately 215° C. with decomposition.

Example 3

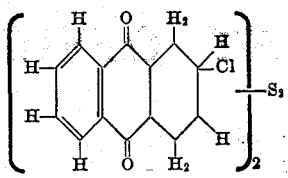

A solution of 3.4 parts of sulfur monochloride in 40 parts of sym. tetrachloroethane is slowly added to an agitated slurry of 10.5 parts of 1,4-dihydroanthraquinone in 160 parts of tetrachloroethane at a temperature of 60° C. After several hours the solution is poured into 400 parts of methanol. The yellow product is isolated in good yield by filtration. It may be purified by dissolving in benzene or toluene and precipitating with alcohol or heptane. The pale yellow crystals melt with decomposition at approximately 200° C.

1. A compound of the formula

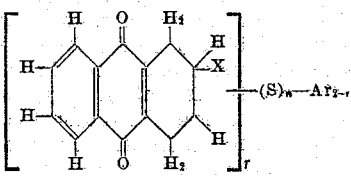

in which Ar is an aromatic radical, X is a halogen of atomic weight between 34 and 82, $r$ and $n$ are positive integers not greater than 2.

2. The compound of the formula

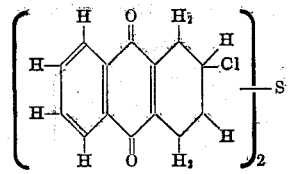

3. The compound of the formula

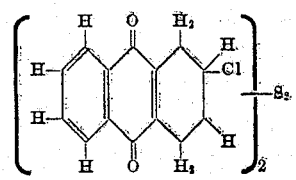

4. A compound of the formula

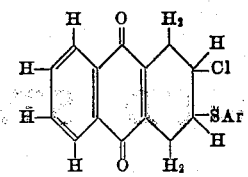

in which Ar is an aromatic radical.

5. The compound of the formula

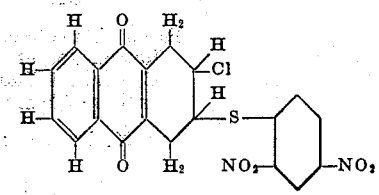

6. A process of preparing a sulfur halide addition product of 1,4-dihydroanthraquinone which comprises reacting 1,4-dihydroanthraquinone in a reaction medium comprising an inert organic liquid with a sulfur halide compound selected from the group consisting of sulfur chlorides and bromides, aromatic sulfenyl chlorides and bromides.

7. A process according to claim 6 in which the sulfur halide compound is an inorganic sulfur halide, the halogen of the halide having an atomic weight between 34 and 82.

8. A process according to claim 6 in which the sulfur halide compound is an aromatic sulfenyl halide, the halogen of the halide having an atomic weight between 34 and 82.

HANS Z. LECHER.
KARL C. WHITEHOUSE.

No references cited.